Sept. 15, 1925.
W. R. NEWTON
1,553,462
STALK CUTTING ATTACHMENT FOR TRACTORS
Filed Aug. 18, 1924
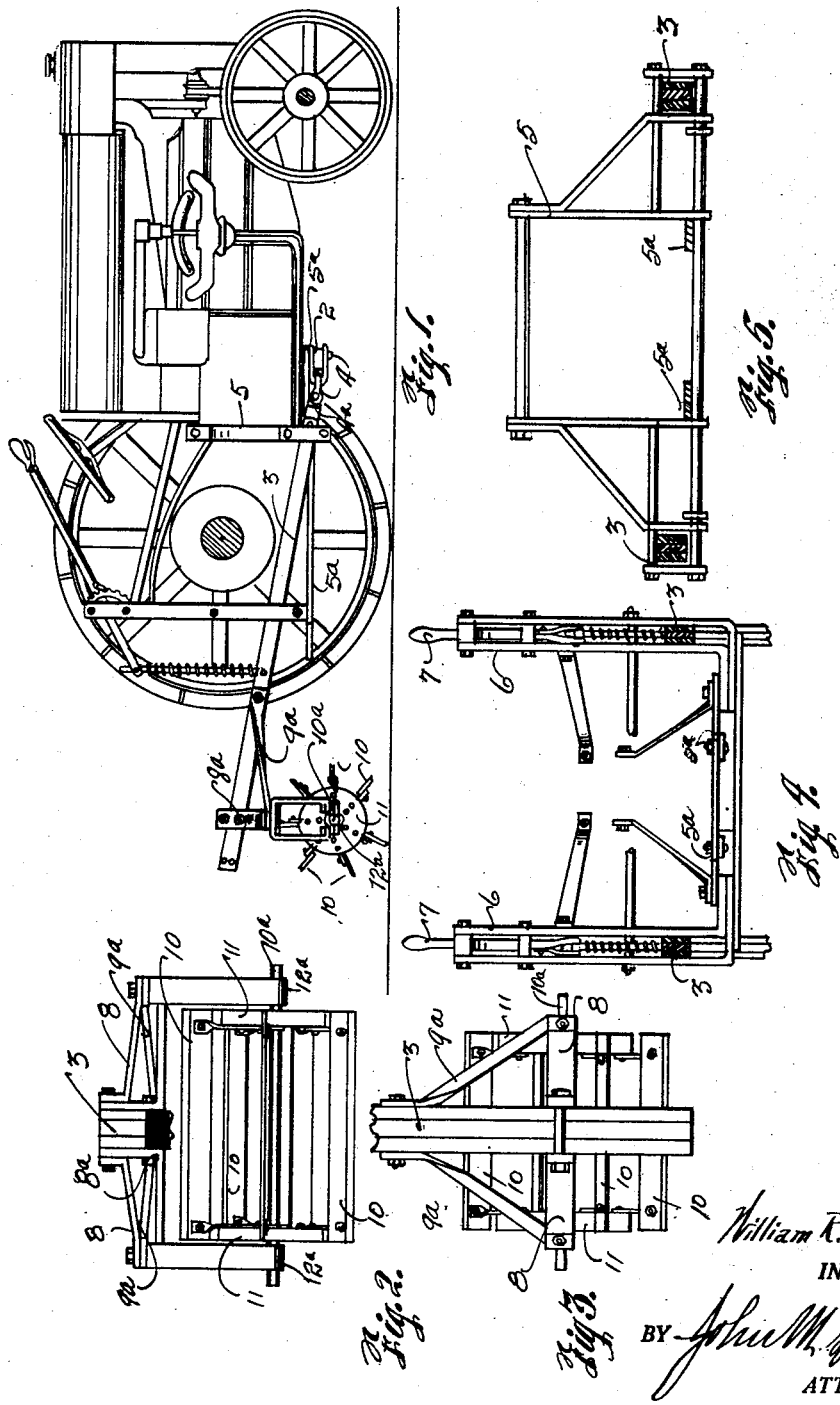
William R. Newton
INVENTOR.
BY John M. Spellman
ATTORNEYS.

Patented Sept. 15, 1925.

1,553,462

UNITED STATES PATENT OFFICE.

WILLIAM R. NEWTON, OF HILLSBORO, TEXAS.

STALK-CUTTING ATTACHMENT FOR TRACTORS.

Application filed August 18, 1924. Serial No. 732,606.

*To all whom it may concern:*

Be it known that I, WILLIAM R. NEWTON, a citizen of the United States, residing at Hillsboro, in the county of Hill and State of Texas, have invented certain new and useful Improvements in Stalk-Cutting Attachments for Tractors, of which the following is a specification.

This invention relates to tractors and refers more specifically to an attachment to tractors for cutting corn stalks and for other uses in preparing a field for cultivation, also to the novel means provided for the attachment of such a device to tractors.

The primary object of the invention is the provision of a new and improved stalk cutter which has in its construction few working parts, and which parts are provided with necessary adjusting facilities for proper performance.

Another object of the invention is to provide a device of this character which may either be attached to or removed from the body of a tractor in a short period of time and which will not in any way impair the utility of the tractor itself.

Features of the invention are apparent in its economical and durable construction, simplicity and utility.

Also, in that the acreage covered by the invention in view of its attachment to a tractor, is much greater than could possibly be covered in as satisfactory a manner, by other farm equipment.

Other objects, features and advantages, as well as those above pointed out, will be described more fully in the course of the following detailed description, in which:

Figure 1 represents a side elevational view of a tractor, upon which the invention is shown in attachment.

Figure 2 represents a rear view of one of the cutters, as it appears secured to the pulling beam.

Figure 3 represents a top or plan view of Figure 2.

Figure 4 represents the lifting lever supporting frame, and

Figure 5 illustrates a second frame for the securing of the apparatus to a tractor.

Following the figures: 1 indicates a tractor. A bar 2, extending transversely beneath the tractor body, is adapted to provide the necessary pulling means for a pair of beams 3—3, which beams are universally secured at their ends to the extremities of this bar 2 by clevises 4—4. Another link 4ª provides further adjustment and extension of the beams 3.

In the Figure 5 is shown the preferred form of frame for the attachment of braces 5ª reinforcing the bar 2. This frame is illustrated in Figure 1 surrounding the transmission housing of the tractor and is indicated by the numeral 5.

It is apparent in view of the location of the various braces described above that an indirect pushing motion is established and whereby greater power is obtained than if the device were secured to and pulled by the pulling bar of the tractor.

Continuing with the description, another frame, illustrated in detail in Figure 4 is secured to the rear of the tractor and has pivoted in upright members 6—6, levers 7—7 oppositely disposed in convenient location on either side of the driver's seat. These levers provide the necessary raising and lowering means for the beams 3—3.

The invention is carried by the beams 3—3 previously mentioned, which constitutes a pair of main bracing bars 8—8, the ends of which are turned upwardly and abut against the sides of the beams 3—3. A bolt 8ª secures these braces to the beam, and immediately above this bolt is a second bolt 9 which extends across the beam and which latter assists the oblique brace 9ª in steadying the attachment in relation to the beam.

A plurality of cutter blades 10—10 are circularly disposed around a shaft 10ª and which are suitably bolted at either end to a cylindrical member 11 situated upon the shaft 10ª. The above members comprise the stalk cutter which latter is supported by the members 12—12, bolted to the outwardly extending ends of the braces 8—8, and suspended downwardly. Upon the extremities of which situated suitable bearings 12ª—12ª for the shaft 10ª.

It is not desired that the invention be limited to the specific construction as herein described and it should be understood that minor changes may be resorted to in the arrangement and construction of the invention as fall within the scope and meaning of what is herein claimed:

A stalk cutting attachment for tractors having a beam connected to the tongue or hitch thereof, comprising an inverted U-shaped frame, a pair of inverted U-shaped side members for said frame, a pair of laterally extending bars, upwardly projecting portions formed with the inner ends of said laterally extending bars adapted to be bolted to the opposite sides of said beam, a pair of bracing bars, the outer ends of said laterally extending and bracing bars being secured to the upper and medial portions of said U-shaped side members whereby the latter will be suspended therefrom, upturned ends formed with the inner ends of said bracing bars for attachment to said beam at a point directly above said U-shaped frame, a bolt extended through said upturned ends of said bracing bars and seated on top of said beam, oblique brace bars having their outer ends connected to said side members and their forward ends connected to said beam forwardly of said U-shaped frame, bearings carried by the lower ends of said side members, and a rotary cutting member journalled within said bearings.

In testimony whereof I have signed my name to this specification.

WILLIAM R. NEWTON.